United States Patent [19]

Suzuki

[11] 4,406,146

[45] Sep. 27, 1983

[54] FORGING DIE FOR A PART WITH INTERNAL, TAPERED GROOVES

[75] Inventor: Hisao Suzuki, Yokohama, Japan

[73] Assignee: Nissan Motor Company, Limited, Kanagawa, Japan

[21] Appl. No.: 309,702

[22] Filed: Oct. 1, 1981

[51] Int. Cl.³ .............................................. B21D 45/00
[52] U.S. Cl. ....................................... 72/353; 72/358; 72/359; 72/361
[58] Field of Search ................ 72/344, 345, 346, 427, 72/353, 357, 360, 361, 358

[56] References Cited

U.S. PATENT DOCUMENTS

| | | | |
|---|---|---|---|
| 3,999,417 | 12/1976 | Orain | 72/353 |
| 4,041,755 | 8/1977 | Rut | 72/353 |
| 4,294,101 | 10/1981 | Dreiner | 72/358 |
| 4,317,356 | 5/1982 | Stell | 72/353 |

FOREIGN PATENT DOCUMENTS

| | | |
|---|---|---|
| 13545 | 7/1980 | European Pat. Off. . |
| 2830275 | 1/1980 | Fed. Rep. of Germany . |
| 1347448 | 11/1963 | France . |
| 52-24978 | 2/1977 | Japan . |

*Primary Examiner*—Leon Gilden
*Attorney, Agent, or Firm*—Lowe, King, Price & Becker

[57] ABSTRACT

A die for forging a part with internal, tapered grooves, for instance, such as a socket with a plurality of inner races used for a joint. The blank is formed into a given shape by a cylindrical projection provided in the upper die so as to compress the outer peripheral surface thereof, in cooperation with the liner-grooving dies, when the upper die is lowered. After the forging step, the locking pin inserted in the lower die is lowered so as to move the liner-grooving die toward the stamping axis so that the forged workpiece can be removed from the lower die easily and next ejected by the ejector pin.

7 Claims, 12 Drawing Figures

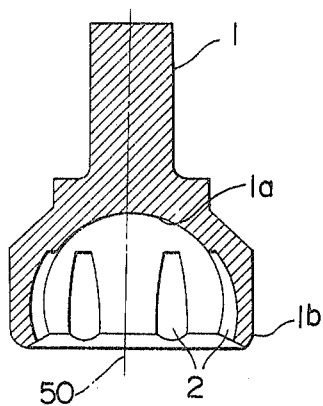
FIG.1 (A)
FIG.1 (B)
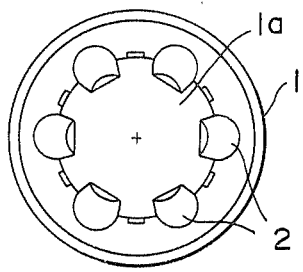
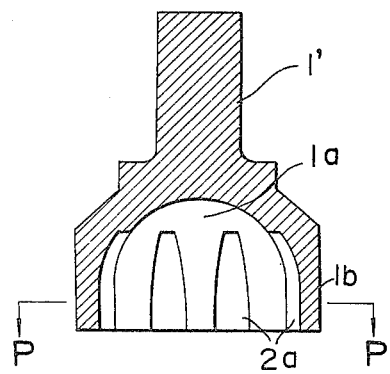
FIG.2

FORGING DIE FOR A PART WITH INTERNAL, TAPERED GROOVES

BACKGROUND OF THE INVENTION

1. Field of the Invention

The present invention relates generally to a forging die, and more specifically to a structure of the forging die to manufacture a part having a plurality of internally-tapered grooves, for instance, such as a socket with a plurality of inner races used for a constant velocity joint or a universal joint.

2. Description of the Prior Art

There are some mechanical parts which are difficult to manufacture by using a simple forging die because of their complex structure.

The typical example among these parts is a socket used for a constant-velocity joint or a universal joint.

The socket is usually provided with a plurality of inner races along which ball bearings are rolled. Since it is necessary to form a plurality of inner races on the inner spherical surface thereof, the inner races inevitably take the form of roughly-semicylindrical grooves tapered internally with respect to the axis of the part, that is, in the stamping direction when manufactured by forging.

In order to manufacture such a mechanical part as described above in the prior-art method, the blank is first preliminarily formed into a predetermined shape such that the lower portions of the semicylindrical grooves are straight, and next the lower portions thereof are stamped from the outside or bent inwards by applying a force thereto.

In this prior-art manufacturing method, however, since the width of the groove is susceptible to change due to the stamping force, an additional cutting step or grinding step is required to obtain the preferred accuracy for the part, thus resulting in the need for a great number of manufacturing steps with their resulting high cost.

To partially overcome these problems, it is known to use a special forging die, provided with a plurality of liner-grooving dies arranged in the lower die so as to pivot in the radially inward direction thereof, as described in Japan Patent Publication No. S52-24978. In this prior-art forging die, a mechanical part with internally tapered grooves can be forged in a simple process; however, a relatively great forging stroke length is required due to the structure thereof.

A more detailed description of this prior-art forging die will be made hereinafter with reference to the attached drawings under DETAILED DESCRIPTION OF THE PREFERRED EMBODIMENTS.

SUMMARY OF THE INVENTION

With these problems in mind therefore, it is the primary object of the present invention to provide a novel forging die whereby a part having a plurality of internally-tapered semicylindrical grooves can be manufactured, while forming the inner surface thereof into an accurate spherical surface, by squeezing the outer peripheral surface of a preliminarily-formed blank through a relatively small stroke of the die.

To achieve the above mentioned object, the forging die according to the present invention comprises: (a) an upper die having a holding fixture portion at the center and a round inwardly-directed projection provided around the lower peripheral surface of the holding fixture portion in order to deform the blank into a given shape; (b) a lower die having a bore at the center; (c) a lock pin inserted into the center bore of the lower die so as to be movable up and down; and (d) a plurality of liner-grooving dies arranged on the lower die so as to be slidably in contact with the top portion of the lock pin in such a way that the liner-grooving dies form the internally-tapered grooves in cooperation with the projection on the upper die and are moved in the radially inward direction when the lock pin is lowered.

BRIEF DESCRIPTION OF THE DRAWINGS

The features and advantages of the forging die according to the present invention will be more clearly appreciated from the following description taken in conjunction with the accompanying drawings in which like reference numerals designate corresponding elements and in which:

FIG. 1(A) is a cross-sectional view of a sample forging part which includes a plurality of internally-tapered grooves;

FIG. 1(B) is a bottom view of the sample forging part illustrated in FIG. 1(A);

FIG. 2 is a cross-sectional view of a first sample blank to be formed into the sample forging part of FIG. 1.

DETAILED DESCRIPTION OF THE PREFERRED EMBODIMENTS

Figure 3A:
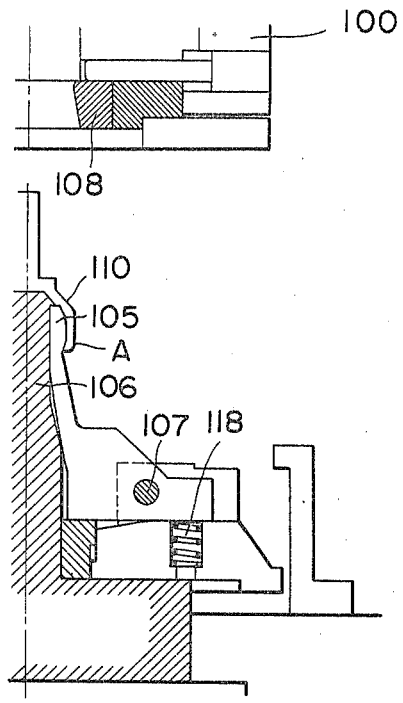
FIG. 3(A) is a cross-sectional view of a prior-art forging die, which illustrates the state wherein the upper die is at its uppermost position.

FIG. 1(A) is a cross-sectional view of a sample forged part in accordance with the invention, and FIG. 1(B) is a bottom view thereof. This sample part is a socket used for a constant-velocity joint or a universal joint. In such a forged part as shown in FIGS. 1(A) and (B), the inner surface of the recessed portion 1a is spherical in shape and includes a plurality of grooves 2 formed along the inner spherical surface thereof.

When such a part 1 is to be manufactured by forging, since the inner grooves are tapered internally with respect to the stamping direction of the die, it is relatively difficult to design the forging die. The stamping axis is shown by arrow 50 in FIG. 1A. In this case, a blank 1' is first formed into a preliminary shape, as shown in FIG. 2, such that the lower portion of the inner spherical surface thereof (lower than the line P—P) is straight, and next the lower portion thereof is stamped or bent inwardly from the outside by applying pressure so that the grooves 2a are tapered off internally and, at the same time, the inner surface of the recessed portion 1a is formed into a spherical shape.

To facilitate understanding of the present invention, a brief reference will be made to the above mentioned prior-art forging die for manufacturing a part with internally-tapered grooves, with reference to FIGS. 3(A)–(C).

Figure 3B:
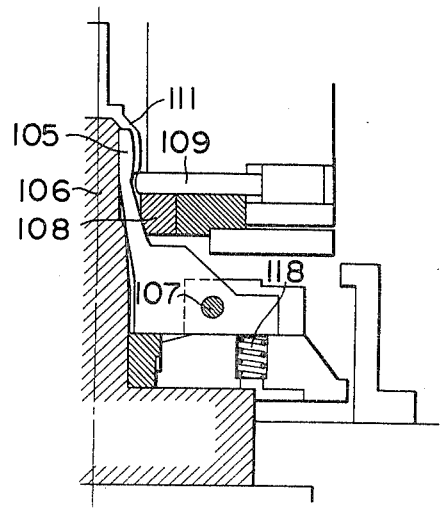
FIG. 3(B) is a cross-sectional view of the same prior-art forging die, which illustrates the state wherein the upper die is at its lowermost position.

FIG. 3(A) illustrates the state wherein the upper die is at its uppermost position; FIG. 3(B) illustrates the state wherein the upper die is at its lowermost position; and FIG. 3(C) illustrates the state wherein the liner-grooving dies are in motion.

When the upper die, identified by the number 100, is at its uppermost position as shown in FIG. 3(A), a blank 110 is put on a guide punch 106 with a plurality of liner-grooving dies 105 disposed between the blank and the guide punch. In this case, there exists a clearance A between the liner-grooving dies 105 and the blank 110.

A ram (not shown) forces the upper die down and also forces a compression die 108 down along the outer peripheral surface of the blank 110 to deform it into a predetermined shape in cooperation with the liner-grooving dies 105. In this case, the clearance A no longer exists. As a result a forged workpiece 111 is produced as shown in FIG. 3(B). Further, when the ram reaches the lowermost position, a stopper pin 109 advances beyond the lowest portion of the blank after the compression step.

Figure 3C:
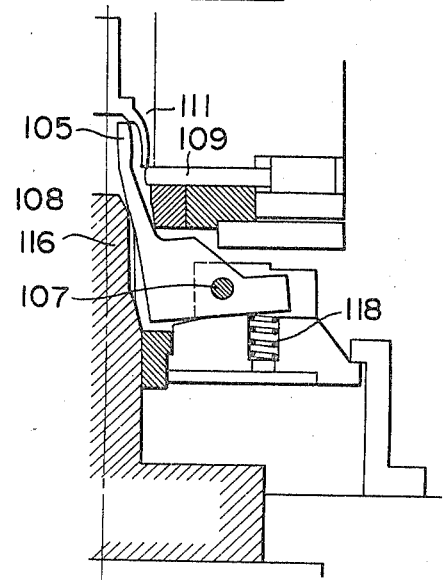
FIG. 3(C) is a cross-sectional view of the same prior-art forging die, which illustrates the state wherein the liner-grooving dies are in motion.

Next, when the ram goes up, the stopper pin 109 lifts the forged workpiece 111 upwardly, and therefore the liner-grooving die 105 is rotated counterclockwise, as seen in FIG. 3(C), around the liner-grooving die pin 107 by the force of a spring 118 so as to be separated from the forged workpiece 111 for easy removal of the workpiece.

Although only one liner-grooving die 105 has been shown, it is understood that the same principles of operation apply to the plurality of liner-grooving dies which are used together in forging the workpiece.

After that, each inner-grooving die 105 is lowered to the original position shown in FIG. 3(A), and the forged workpiece 111 is lifted to the uppermost position. The forged workpiece is then removed from the compression die 108 at this uppermost position.

In this prior-art forging die, a relatively great forging stroke is required.

Figure 4A:
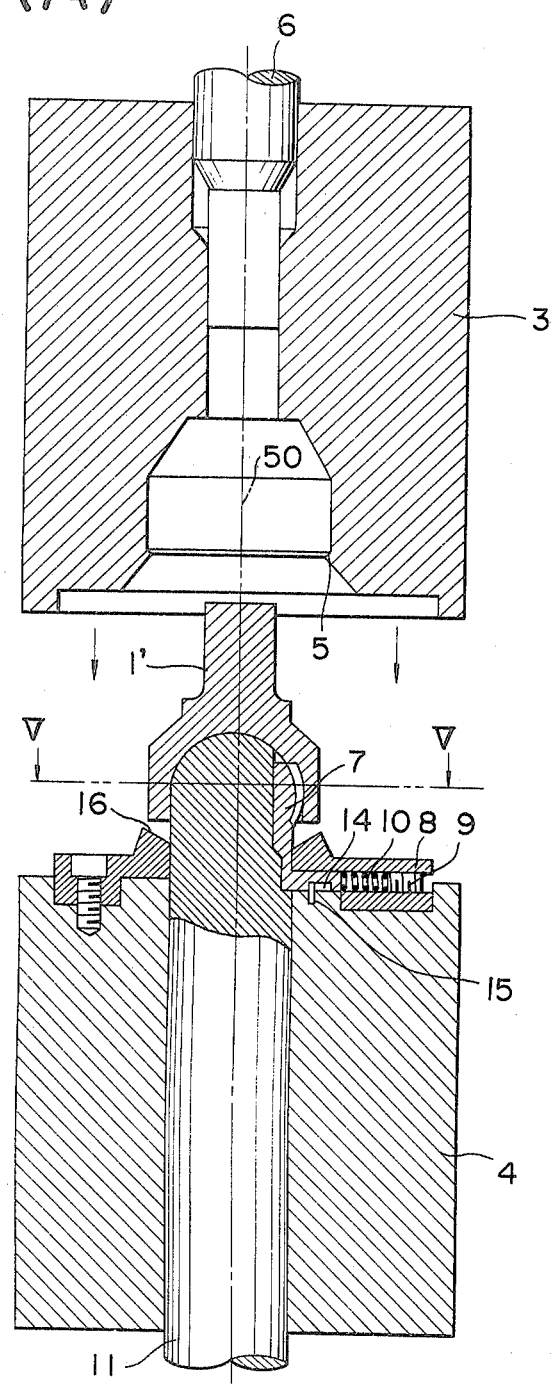
FIG. 4(A) is a cross-sectional view taken along the lines IV—IV of FIG. 5 of a first preferred embodiment of the forging die according to the present invention, which illustrates the state wherein the upper die is at its uppermost position.

In view of the above description, reference is now made to FIGS. 4–7, and more specifically to FIGS. 4(A)–(C), in which there is described a first preferred embodiment of the present invention.

In these figures, the forging die of the present invention roughly comprises a set of an upper die 3 and a lower die 4, an ejector pin 6 fitted into a centeral bore of the upper die 3, a lock pin 11 fitted into a centeral bore of the lower die 4, and a plurality of liner-grooving dies 7 only one of which is shown.

FIG. 4(A) illustrates the state where the upper die is at its uppermost position; FIG. 4(B) illustrates the state where the upper die is at its lowermost position; FIG. 4(C) illustrates the state where the lock pin is lowered to shift the liner-grooving dies so that the work piece can be easily removed from the die.

The upper die 3 has a holding fixture portion at the center thereof, and a circular inwardly-directed ridge or projection 5 is provided around the lower peripheral surface of the holding fixture in order to deform the blank (preliminarily-formed into a predetermined shape) into a given shape under compression forces. In addition, the ejector pin 6 is provided to outwardly eject the forged workpiece pressed into the upper die 3 after the workpiece has been completely forged.

On the other hand, in the lower die 4, there are provided a plurality of liner-grooving dies 7 to form the same number of grooves on the inner spherical surface of the blank in cooperation with the projection 5. The example of the shape of these grooves is already explained with reference to FIGS. 1(A) and (B). These liner-grooving dies 7 are slidably supported by an annular retainer 8. The retainer 8 has a number of radially-arranged grooves, into each of which the lower, flat portion of one liner-grooving die is fitted. Into each groove, a helical spring 10 is so inserted as to urge the liner-grooving die 7 radially inward. Further, in this embodiment, the urging force thereof is adjustable by using a screw 9 for each of the springs 10.

Figure 4:
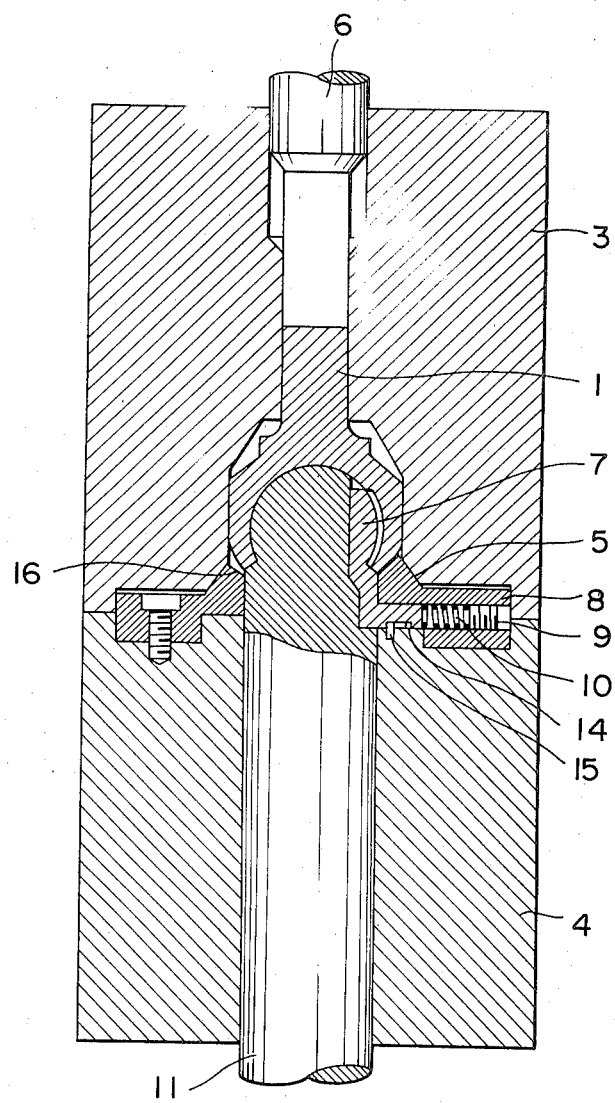
FIG. 4(B) is a cross-sectional view taken along the lines IV—IV of FIG. 5 of the same first preferred embodiment of the forging die according to the present invention, which illustrates the state wherein the upper die is at its lowermost position.
FIG. 4(C) is a cross-sectional view taken along the lines IV—IV of FIG. 5 of the same first preferred embodiment of the forging die according to the present invention, which illustrates the state where the lock pin is lowered to shift the liner-grooving dies so that the work piece can be easily removed from the die.
Figure 4:
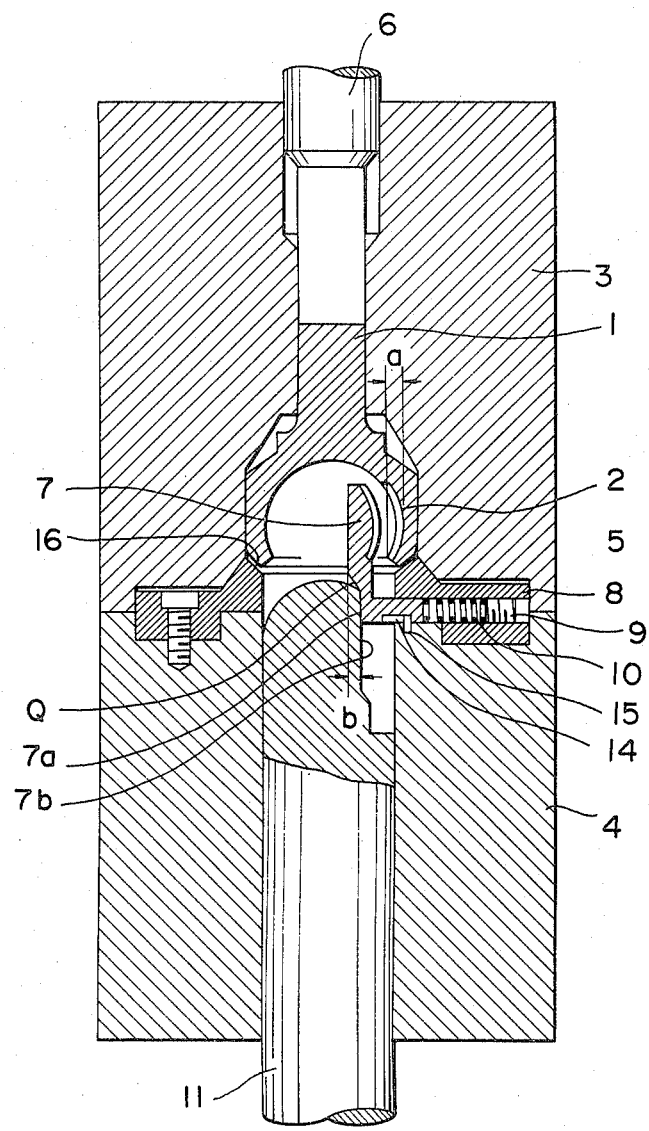
Figure 5:
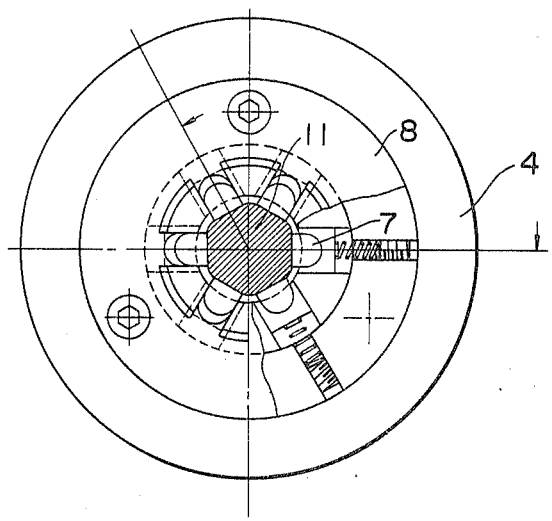
FIG. 5 is a composite view of partial cross-sectional view taken along the lines V—V of FIG. 4(A) and partial top-view showing the liner-grooving dies and the annular retainer of the embodiment of the forging die according to the present invention, but excluding the blank.

The lock pin 11 is provided in the bore formed at the center of the lower die 4 so as to be movable up and down. The top of the lock pin 11 is so formed as to engage with each vertical end surface of the liner-grooving die 7, as depicted in FIGS. 4 and 5.

In this embodiment, in order to restrict the distance that the liner-grooving dies can move, a stopper groove 14 is formed on the bottom of each liner-grooving die 7 so as to engage with each stopper pin 15 implanted in the lower die 4.

Now, follows a description of operation on the forging die thus constructed. As shown in FIG. 4(A), first the top of the lock pin 11 and the vertical inner surfaces of the liner-grooving dies 7 are radially aligned, and next a preliminarily-formed blank 1' is put onto the liner-grooving dies with the respective grooves 2a (see FIG. 2) of the blank fitted to the respective liner-grooving dies 7. In this case, since no internally-tapered grooves 2a exist, it is possible to fit the liner-grooving dies 7 easily to the inner spherical surface of the blank.

Figure 6:
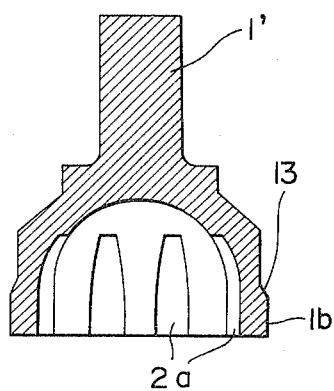
FIG. 6 is a cross-sectional view of a second sample blank to be formed into the sample forging part of FIG. 1.

Here, it is assumed that the shape of the blank 1' is the same as shown in FIG. 2, or the one as shown in FIG. 6 where an additional slope portion 13 is provided to form a thicker portion 1b. Further, since the blank 1' does not have internally-tapered grooves in the stamping direction, it is possible to manufacture the blank easily by an ordinary hot forging process.

Next, as depicted in FIG. 4(B), when the upper die 3 is lowered, the projection 5 of the upper die 3 compresses and deforms the thicker outer peripheral surface 1b of the blank 1', so that the lower portions of the grooves 2a supported by the liner-grooving dies 7 from the inside are formed so as to provide accurate internally-tapered grooves and, at the same time, the inner peripheral surface of the blank is deformed into a predetermined spherical surface.

After the blank 1' has been forged as described hereinabove, the lock pin 11 is lowered to a given position as shown in FIG. 4(C), so that the liner-grooving dies 7 move in the radially inward direction due to the force of the springs 10 thus sliding away from the grooves 2 of the forged workpiece 1. In this case, the end surface 7a of each liner-grooving die 7 is stopped when being brought into contact with the step surface 7b provided in the lock pin 11. Therefore, when the upper die 3 is lifted to a given position, the workpiece 1 which has been already forged can be removed readily from the liner-grooving dies 7. In this case, since the forged work piece 1 is lifted up in contact with the upper die 3, it is necessary to eject it downward by lowering the ejector pin 6.

Further, in the embodiment described above, in order to easily remove the liner-grooving dies 7 from the internally-tapered grooves 2 of the forged workpiece 1 or prevent the liner-grooving dies 7 from interfering with the grooves when the lock pin 11 is set, it is necessary to design the forging die in such a way that the distance b that the liner-grooving die 7 moves is greater than the depth a in the curved portion of the liner-grooving die 7, as depicted in FIG. 4(C).

In this case, it may also be possible to restrict the distance that the liner-grooving die 7 moves by providing a stopper groove 14 on the bottom of the liner-grooving die 7 and a stopper pin 15 on the lower die 4 which can engage with the stopper groove 14.

Further, as the means for urging the liner-grooving dies 7 in the radially inward direction, it is possible, for example, to use a fluid-pressure cylinder mechanism, a cam mechanism or a link mechanism, without being limited to the helical spring 10.

Further, in this embodiment, the outer, upper surface of the retainer 8 may be flat; however, it is also preferable to form a slope 16 on the retainer 8 on the inner side, as depicted in FIG. 4(C), so that the material near the bottom, outer peripheral surface of the blank can deform smoothly in the material flow direction since the slope 16 acts as a compression surface, in order to prevent problems in the workpiece such as burrs or scratches.

Figure 7:
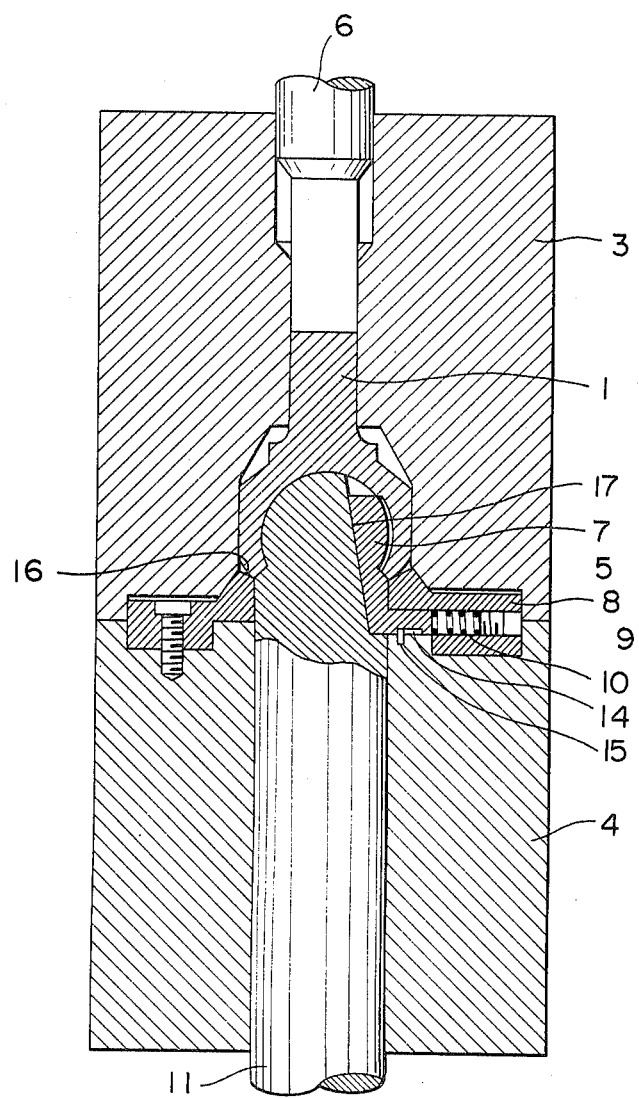
FIG. 7 is a cross-sectional view of a second preferred embodiment of the forging die according to the present invention, which illustrates the state where the upper die is at its lowermost position.

FIG. 7 shows a second preferred embodiment of the forging die according to the present invention, which illustrates the state wherein the upper die is at its lowermost position.

In this embodiment, the contact surfaces 17 between the liner-grooving dies 7 and the lock pin 11 are formed into tapered surfaces. Since the contact surfaces 17 are tapered surfaces, it is possible to easily engage the lock pin 11 with said liner-grooving dies, and this feature is very important when the parts are repeatedly manufactured in order to increase productivity.

In addition, in the above-mentioned embodiments, it is also possible to use the upper die as the lower die, or vice versa. In this case, it is obvious that a preliminarily-formed blank is set to the upper die, and the upper die is provided with the lock pin and the liner-grooving dies are lowered into the lower die provided with the projection for the compression step.

As described above, in the forging die according to the present invention, since the lock pin is movable up and down at the center of the lower die and is fitted to the inside of the respective liner-grooving dies so as to shift the dies in the radial direction for easy removal of the forged workpiece, and since the projection is provided around the lower peripheral surface of the holding fixture portion of the upper die so as to compress the peripheral surface of the blank, it is possible to form accurate internally-tapered semicylindrical grooves in a blank in which straight grooves are previously formed and, at the same time, to form the inner surface of the blank into an accurate spherical surface.

Further, since the liner-grooving dies can be moved easily apart from the forged workpiece only by lowering the lock pin to a given position after the forging step, it is possible to easily remove the forged workpiece.

Since the forged part formed by the forging die according to the present invention has a high accuracy without any other cutting or grinding steps, it is possible to reduce the number of manufacturing processes markedly and therefore manufacturing cost. This has a great effect on the manufacture of forging parts having internally-tapered grooves, such as sockets having a plurality of inner races used for a constant velocity joint or a universal joint for an automotive vehicle.

It will be understood by those skilled in the art that the foregoing description is in terms of preferred embodiment of the present invention wherein various changes and modifications may be made without departing from the spirit and scope of the invention, as is set forth in the appended claims.

What is claimed is:

1. A forging die for forming a forged workpiece from a blank, said forged workpiece having concave, tapered internal grooves, said forging die comprising:
   (a) a first die having a shaped member adapted for contact with the blank to forge the same, a cylindrical projection being provided around an inner surface of the shaped member to form the outer shape of the blank into a given shape;
   (b) a second die having a central bore therethrough and aligned with said first die along a common stamping axis, said first and second dies being movable along the stamping axis toward one another for compressing the shaped member of said first die against the outer surface of the blank;
   (c) a plurality of liner-grooving dies having outer surfaces of tapered, convex shape for forming tapered, concave internal grooves within the blank during forging of the blank to form the forged workpiece;
   (d) means for biasing said liner-grooving dies radially toward the stamping axis thereby releasing said forged workpiece from said second die;
   (e) a locking pin mounted in the central bore of said second die and movable therein along said stamping axis, said locking pin having a contact portion movable in contact with said line-grooving dies for inhibiting motion of said liner-grooving dies toward the stamping axis during forging of the workpiece, said contact portion movable out of contact with said liner-grooving dies after forming the forged workpiece for permitting said biasing means to release said forged workpiece; and
   (f) means for securing said liner-grooving dies to said second die, said securing means preventing motion of said liner-grooving dies relative to said second die along said stamping axis, but permitting motion of said liner-grooving dies toward said stamping axis.

2. A forging die for forming a forged workpiece from a blank as set forth in claim 1, which further comprises an ejector pin for pushing out the forged workpiece, said ejector pin being provided in said upper die.

3. A forging die for forming a forged workpiece from a blank as set forth in claim 1, wherein said means for securing said liner-grooving dies to said second die includes an inner top surface of a predetermined slop relative to the radial direction, said inner top surface positioned for contact with the bottom portion of the blank, so that the outer peripheral surface of the blank can deform smoothly during forging thereby reducing production of burr or scratches.

4. A forging die for forming a forged workpiece from a blank as set forth in claim 3, wherein said means for securing said liner-grooving dies to said second die further comprises:

(a) a stopper groove formed on the bottom surface of each of said liner-grooving dies; and (b) a plurality of stopper pins, each pin securred to said second die and having a portion thereof projecting into a corresponding stopper groove of each of said liner-grooving dies;

whereby the travel of said liner-grooving die can be restricted within a fixed range.

5. A forging die for forming a forged workpiece from a blank as set forth in claim 1, wherein the contact portion of the locking pin and the corresponding contact surface of said liner-grooving dies are formed into tapered surfaces for facilitating engagement of said locking pin with said liner-grooving dies.

6. A forging die for forming a forged workpiece from a blank as set forth in claim 1, wherein said biasing means comprises a spring for each of said liner-grooving dies.

7. A forging die for forming a forged workpiece from a blank as set forth in claim 1, wherein said securing means includes means for permitting translational motion of said liner-grooving dies toward said stamping axis and for preventing rotational movement of said liner-grooving dies.

* * * * *

UNITED STATES PATENT AND TRADEMARK OFFICE
CERTIFICATE OF CORRECTION

PATENT NO. : 4,406,146     Page 1 of 4
DATED : September 27, 1983
INVENTOR(S) : Hisao Suzuki It is certified that error appears in the above-identified patent and that said Letters Patent is hereby corrected as shown below:

On the title page add: -- Foreign Application Priority Data

Oct.ber 2, 1980     Japan     55-136710 --

Column 1, line 8, should read --die, and more specifically to a forging--

Column 1, line 9, should read --die for manufacturing a plural internal---

Column 1, line 10, should read --ly-tapered grooves, such as a socket with--

Column 1, line 11, should read --plural inner races used for a constant velocity joint--

Column 1, line 20, should read --inner races along which ball bearings roll. Since it--

Column 1, line 22, should read --inner spherical surface of the socket, the inner races inevita---

UNITED STATES PATENT AND TRADEMARK OFFICE
CERTIFICATE OF CORRECTION

PATENT NO. : 4,406,146
DATED : September 27, 1983
INVENTOR(S) : Hisao Suzuki

It is certified that error appears in the above-identified patent and that said Letters Patent is hereby corrected as shown below:

Column 1, line 27, should read --To manufacture the aforesaid mechanical part using--

Column 1, line 28, should read --known methods, a blank is first--

Column 3, line 19, should read --cal surface thereof (below the line P-P) is straight.--

Column 3, line 20, should read --Next, the lower portion thereof is stamped or bent--

Column 3, line 62, should read --Subsequently, each inner-grooving die 105 is lowered to--

Column 4, line 7, should read --lower die 4, an ejector pin 6 fitted into a central bore of--

UNITED STATES PATENT AND TRADEMARK OFFICE
CERTIFICATE OF CORRECTION

PATENT NO. : 4,406,146                    Page 3 of 4
DATED      : September 27, 1983
INVENTOR(S): Hisao Suzuki It is certified that error appears in the above-identified patent and that said Letters Patent is hereby corrected as shown below:

Column 4, line 8, should read --the upper die 3, a lock pin 11 fitted into a central bore--

Column 4, line 29, should read --of the blank in cooperation with the projection 5. An--

Column 4, line 36, should read --groove, a helical spring 10 is inserted so as to urge--

Column 5, line 11, should read --move radially inward due to the force of--

Column 5, line 37, should read --Further, as a means for urging liner-grooving--

Column 5, line 44, should read --ble to form a slope 16 on the inner side of the retainer,--

Column 5, line 49, should read --vent defects from occurring in the workpiece, such as burrs or--

UNITED STATES PATENT AND TRADEMARK OFFICE
CERTIFICATE OF CORRECTION

PATENT NO. : 4,406,146

DATED : September 27, 1983

INVENTOR(S) : Hisao Suzuki

It is certified that error appears in the above-identified patent and that said Letters Patent is hereby corrected as shown below:

Column 5, line 57, should read --as tapered surfaces. Since the contact surfaces 17 are--

Column 5, line 65, should read --formed blank is set in the upper die, and the upper die is--

Column 7, line 12, should read --includes an inner top surface of a predetermine slope--

Column 8, line 1, should read --(b) a plurality of stopper pins, each pin secured to--

Signed and Sealed this

Thirtieth Day of April 1985

[SEAL]

Attest:

DONALD J. QUIGG

Attesting Officer    Acting Commissioner of Patents and Trademarks